United States Patent
Jeromin

(10) Patent No.: US 12,111,462 B2
(45) Date of Patent: Oct. 8, 2024

(54) LIGHT DISPLAY SYSTEMS AND METHODS

(71) Applicant: Universal City Studios LLC, Universal City, CA (US)

(72) Inventor: Aaron Jeromin, Orlando, FL (US)

(73) Assignee: Univeral City Studios LLC, Universal City, CA (US)

(*) Notice: Subject to any disclaimer, the term of this patent is extended or adjusted under 35 U.S.C. 154(b) by 191 days.

(21) Appl. No.: 17/223,733

(22) Filed: Apr. 6, 2021

(65) Prior Publication Data
US 2021/0364789 A1 Nov. 25, 2021

Related U.S. Application Data

(60) Provisional application No. 63/026,811, filed on May 19, 2020.

(51) Int. Cl.
| | |
|---|---|
| *G02B 27/00* | (2006.01) |
| *G02B 17/02* | (2006.01) |
| *G02B 26/08* | (2006.01) |
| *G02B 27/01* | (2006.01) |
| *G02B 27/14* | (2006.01) |
| *G09G 3/02* | (2006.01) |

(52) U.S. Cl.
CPC ......... *G02B 27/0081* (2013.01); *G02B 17/02* (2013.01); *G02B 26/0816* (2013.01); *G02B 26/0833* (2013.01); *G02B 27/0172* (2013.01); *G02B 27/14* (2013.01); *G09G 3/02* (2013.01)

(58) Field of Classification Search
CPC ............ G02B 26/0816; G02B 26/0833; G02B 17/02; G02B 27/14; G02B 27/017; G02B 27/0172; G02B 27/0081; G02B 2027/0187; G09G 3/02
See application file for complete search history.

(56) References Cited

U.S. PATENT DOCUMENTS

| 5,682,171 A | * | 10/1997 | Yokoi | ............. | G09G 3/003 |
| | | | | | 348/51 |
| 5,764,280 A | * | 6/1998 | Bloom | ............. | B60K 35/00 |
| | | | | | 348/E13.059 |

(Continued)

OTHER PUBLICATIONS

PCT/US2021/031086 International Search Report and Written Opinion mailed Aug. 4, 2021.

*Primary Examiner* — Nitin Patel
*Assistant Examiner* — Cory A Almeida
(74) *Attorney, Agent, or Firm* — Fletcher Yoder, P.C.

(57) ABSTRACT

A light display system may display an image to a user and/or an audience using a persistence of vision effect. In an embodiment, a light display system includes a light source configured to emit a plurality of light patterns that correspond to multiple frames of an image. The light source is configured to sequentially emit the plurality of light patterns based on instructions from a control system such that the multiple frames are presented in a sequence at a first rate. The light display system also includes an image expander configured to reflect the plurality of light patterns toward a user of the head-mounted device, wherein at least a portion of the image expander is configured to rotate relative to the light source at a second rate that is coordinated with the first rate by the control system to thereby display the image for visualization by the user.

20 Claims, 4 Drawing Sheets

(56) References Cited

U.S. PATENT DOCUMENTS

| | | | |
|---|---|---|---|
| 6,271,808 B1 * | 8/2001 | Corbin | G02B 27/0172 348/E13.059 |
| 6,614,407 B2 | 9/2003 | Perlman | |
| 11,002,971 B1 * | 5/2021 | Wittenberg | G02B 27/0172 |
| 2011/0032365 A1 | 2/2011 | Yett | |
| 2016/0286210 A1 | 9/2016 | Border et al. | |
| 2021/0026141 A1 | 1/2021 | Hayashi | |

* cited by examiner

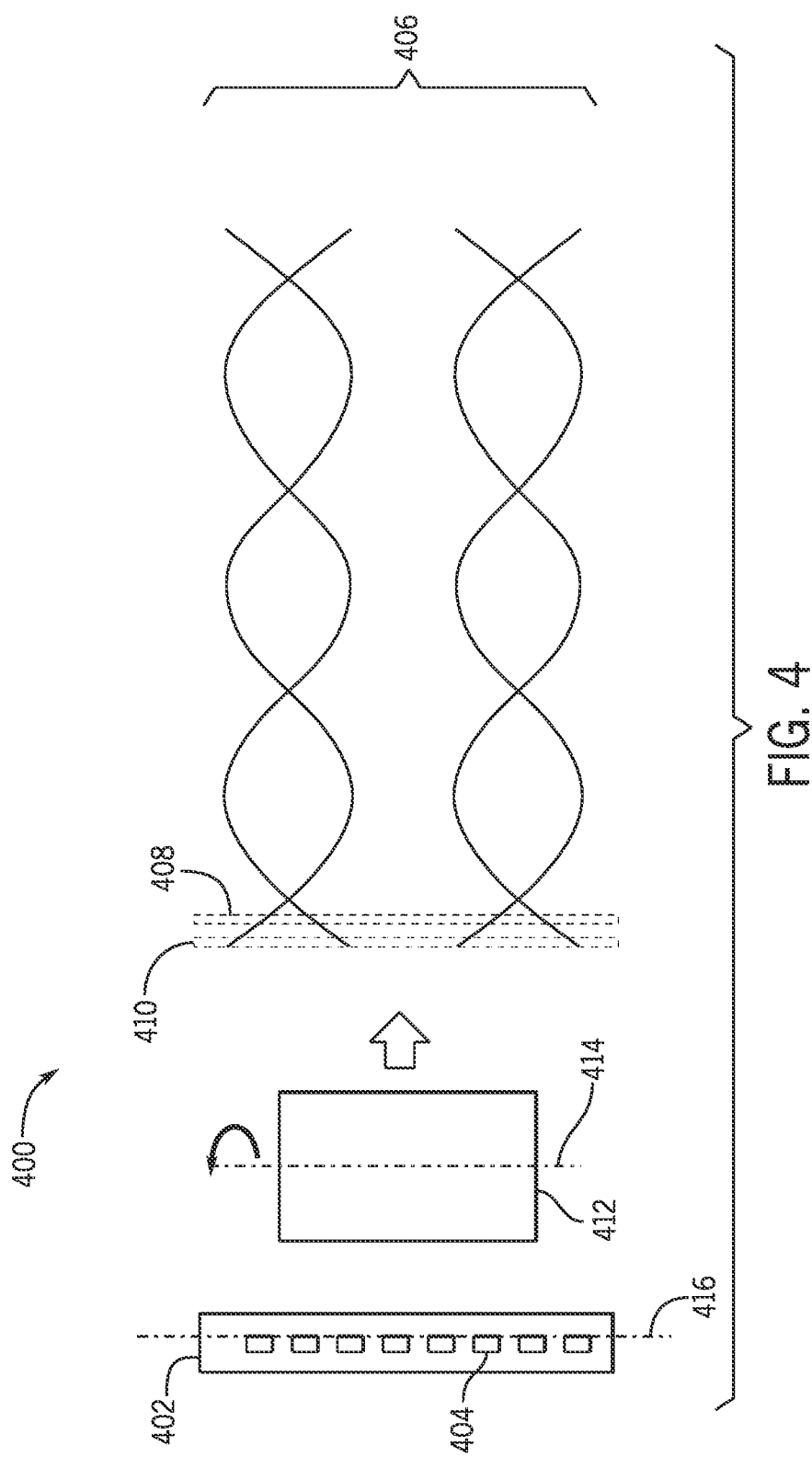

LIGHT DISPLAY SYSTEMS AND METHODS

CROSS-REFERENCE TO RELATED APPLICATION

This application claims priority to and the benefit of U.S. Provisional Application Ser. No. 63/026,811, entitled "LIGHT DISPLAY SYSTEMS AND METHODS," filed on May 19, 2020, which is hereby incorporated by reference in its entirety for all purposes.

BACKGROUND

The present disclosure relates generally to light display systems and methods for amusement park attractions and experiences.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Amusement parks often contain attractions or experiences that use video and/or still images to provide enjoyment and entertain guests of the amusement parks. For example, the attractions may include themed environments established using display devices displaying media content (e.g., in the form of video, text, still image, motion graphics, or a combination thereof). For some attractions, it may be desirable to display media content with special visual effects to create a realistic and/or immersive viewing or playing experience for an audience. In one example, such special visual effects may be achieved using virtual reality technology, augmented reality technology, and/or mixed reality technology, where the media content is displayed using a headset and/or head mounted display to generate images on an electronic display positioned in front of eyes of a user. However, displaying media content via an augmented reality headset, virtual reality headset, and/or mixed reality headset may be challenging due to considerations relating to cost, complexity, and/or equipment availability, for example.

SUMMARY

Certain embodiments commensurate in scope with the originally claimed subject matter are summarized below. These embodiments are not intended to limit the scope of the claimed subject matter, but rather these embodiments are intended only to provide a brief summary of possible forms of the subject matter. Indeed, the subject matter may encompass a variety of forms that may be similar to or different from the embodiments set forth below.

In an embodiment, a light display system includes a light source configured to emit a plurality of light patterns that correspond to multiple frames of an image. The light source is configured to sequentially emit the plurality of light patterns based on instructions from a control system such that the multiple frames are presented in a sequence at a first rate. The light display system also includes a head-mounted device. The head-mounted device includes an image expander configured to reflect the plurality of light patterns toward a user of the head-mounted device, wherein at least a portion of the image expander is configured to rotate relative to the light source at a second rate that is coordinated with the first rate by the control system to thereby display the image for visualization by the user.

In an embodiment, a light display system includes a light source configured to emit a plurality of light patterns that correspond to multiple frames of an image. In the embodiment, the light source is configured to sequentially emit the plurality of light patterns based on instructions from a control system such that the multiple frames are presented in a sequence at a first rate. In the embodiment, the system also includes a first reflective surface configured to rotate relative to the light source at a second rate that is coordinated with the first rate by the control system to thereby display the image for visualization by a user. In the embodiment, the system also includes a motor configured to drive the first reflective surface to rotate relative to the light source.

In an embodiment, a light display system includes a light source configured to emit a plurality of light patterns that correspond to multiple frames of an image. In the embodiment, the light source is configured to sequentially emit the plurality of light patterns for the multiple frames such that the multiple frames are presented in a sequence. In the embodiment, the system also includes a reflective surface configured to rotate relative to the light source to thereby display the image for visualization by a user based on a persistence of vision effect. In the embodiment, the system also includes a motor configured to drive the reflective surface to rotate relative to the light source. In the embodiment, the system also includes a sensor configured to detect a starting light and to transmit a first signal in response to detecting the starting light. In the embodiment, the first signal is indicative of operation of the light source to emit the plurality of light patterns that correspond to the multiple frames of the image. In the embodiment, the system also includes at least one processor communicatively coupled to the sensor and the motor. In the embodiment, the system also includes at least one non-transitory computer-readable media communicatively coupled to the at least one processor. In the embodiment, the at least one non-transitory computer-readable media stores instructions which, when executed, cause the processor to perform operations including receiving, via the sensor, the first signal and in response to receiving the first signal, transmitting a second signal to the motor to cause the motor to drive the reflective surface to rotate relative to the light source.

Various refinements of the features noted above may be undertaken in relation to various aspects of the present disclosure. Further features may also be incorporated in these various aspects as well. These refinements and additional features may exist individually or in any combination.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein:

FIG. 4 illustrates a schematic diagram of a light display system including a light source with a single column of pixels, in accordance with an embodiment of the present disclosure.

DETAILED DESCRIPTION

Figure 1:
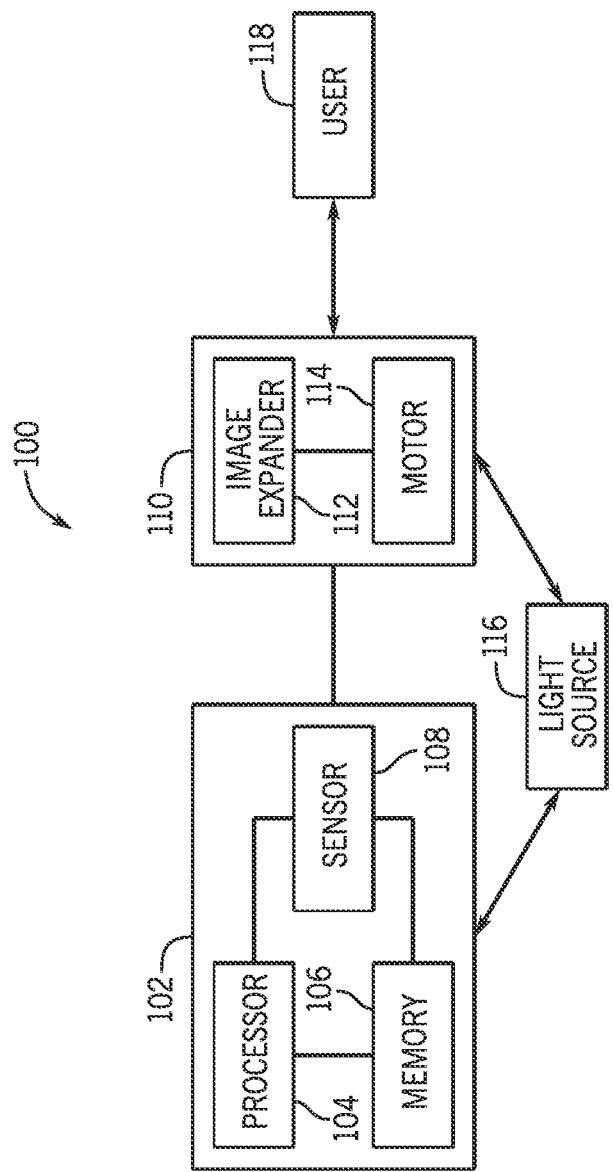
FIG. 1 illustrates a block diagram of a light display system, in accordance with an embodiment of the present disclosure.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Further, to the extent that certain terms such as parallel, perpendicular, and so forth are used herein, it should be understood that these terms allow for certain deviations from a strict mathematical definition, for example, to allow for deviations associated with manufacturing imperfections and associated tolerances.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As noted above, amusement parks often contain attractions or experiences that use video and/or still images to provide enjoyment and entertain guests of the amusement parks. Some amusement parks may use virtual reality technology, augmented reality technology, and/or mixed reality technology, where media content is displayed on an electronic display of a headset and/or head mounted display. It is now recognized that other types of visual effects may be useful to display media content. For example, persistence of vision techniques may be useful to display media content in a way that provides unique viewing experiences for the guests. Persistence of vision may result when the human mind combines a series of images into a moving image (e.g., due to the human eye retaining images for up to a sixteenth of a second). In particular, successive images that are displayed faster than the human eye can process images results in the convergence of the successive images such that the series of images is observed by the guests as the moving image.

The present disclosure relates generally to light display systems and methods, and, more particularly, to light display systems capable of displaying media content using the persistence of vision effect. The light display systems may be used to display the media content for amusement park attractions and experiences. The attractions may include any type of attraction that is designed to entertain a guest, such as an attraction that includes a ride vehicle that carries one or more guests as the ride vehicle travels along a path, an attraction that includes a room or theatre with one or more stationary or moving seats for one or more guests to sit in while the one or more guests watch a show, or the like. The experiences may include any type of experience that is designed to entertain a guest, such as an aerial show (e.g., firework show; un-manned aerial vehicle show), an advertising board within a store, or the like. Additionally, while the disclosed embodiments generally discuss light display systems that are used for entertainment purposes, the disclosed embodiments may also apply to light display systems that are used for any other suitable purpose.

With the foregoing in mind, FIG. 1 is a block diagram of a light display system 100 including a system controller block 102, a display module 110, and a light source 116, according to an embodiment of the present disclosure. The system controller block 102 may control operation of the display module 110 and/or the light source 116. The system controller block 102 may process data signals acquired from the display module 110 and/or the light source 116. The display module 110 and/or the light source 116 may be coupled to the system controller block 102 by any suitable techniques for communicating control signals and/or data signals between the display module 110 and the system controller block 102 and/or between the light source 116 and the system controller block 102, such as a wireless, optical, coaxial, or other suitable connection.

As will be appreciated, the system controller block 102 may include a number of elements to control operation of the display module 110, facilitate rotation of an image expander 112 (e.g., linear expander; via control of a motor 114), control operation of the light source 116, and/or facilitate interpretation of data signals from the light source 116, for example. For instance, as illustrated, the system controller block 102 may include a processor 104, a memory 106, and a sensor 108. In an embodiment, the system controller block 102 may include additional elements not shown in FIG. 1, such as data acquisition circuitry, additional processing circuitry, a user interface, and so forth. The sensor 108 may be a light sensor and may detect light emitted from a source, such as the light source 116. For example, the sensor 108 may detect visible light, infrared light, ultraviolet light, and/or light in any other suitable portion of the electromagnetic spectrum. The sensor 108 may transmit a data signal to the processor 104 in response to detection of the light. For example, the data signal may indicate the light source 116 is beginning a display sequence, as described further herein.

The light source 116 may be a light emitting diode (LED) display, a laser diode display, or the like. In an embodiment, the light source 116 may be a light bar formed by a single line (e.g., a single vertical column or a single horizontal row) of pixels. In an embodiment, more than one line may be used but less than the total number lines that would provide a full version of an image, as discussed below, if the lines were assembled to provide a traditional view of the image by simultaneous activation. The light source 116 may display a frame (e.g., slice or portion) of an image at a time. In particular, the light source 116 may display a plurality of light patterns (e.g., arrangement of illuminated pixels) that correspond to multiple frames of the image in quick succession and in sequential order over time, such as to display each frame of the image from left to right, right to left, top to bottom, bottom to top, and/or any other suitable order. While the light source 116 may provide a limited number of lines of pixels (e.g., only a single line of pixels), if the frames presented by such an embodiment of the light source 116 were physically arranged in the order of presentation, the frames would combine to provide a full version of the image. In an embodiment, the light source 116 may provide the plurality of light patterns to display all frames of the image within a time period associated with and to enable a persistence of vision effect. For example, the light source 116 may successively display the plurality of light patterns for all frames of the image in less than one fifth of a second (e.g., one tenth of a second, one sixteenth of a second, and so on). The light source 116 may repeat the display of the plurality of light patterns for each frame and/or sequence of frames (e.g., to thereby repeatedly display the image) any number of times.

As discussed in more detail below, operation of the light source 116 is coordinated with operation of the display module 110 to enable a user 118 to visualize the image. To facilitate coordination between the light source 116 and the display module 110, in an embodiment, the light source 116 may emit a pulse of light (e.g., starting pulse; starting light), such as infrared light, indicative of beginning to emit frames of the image. For example, the light source 116 may emit the pulse of light and the sensor 108 may detect the pulse of light. In an embodiment, the sensor 108 may generate and transmit a data signal to the processor 104 indicative of the detected pulse of light. Then, the processor 104 may control the display module 110 based on and/or in response to receipt of the data signal. The pulse of light may be a separate light or the light that corresponds to one or more frames of the image to be visualized by the user 118.

The display module 110 may include the image expander 112 and the motor 114. The image expander 112 may include a reflective surface and may reflect light displayed by the light source 116 toward the user 118. The image expander 112 may reflect and/or display successive portions of an image formed by light emitted from a line of pixels of light source 116, such as a light bar, as described herein. In an embodiment, the image expander 112 may include a mirror, such as a semi-silvered mirror or a fully silvered mirror. In an embodiment, the image expander 112 may include additional components, such as one or more additional reflective surfaces (e.g., a prism) that may reflect light displayed by the light source 116 towards the reflective surface. The reflective surface of the image expander 112 may rotate relative to the light source 116 and the user 118. For example, the reflective surface of the image expander 112 may rotate about an axis (e.g., rotational axis) substantially parallel (e.g., equal to or within five, ten, or fifteen degrees) to an axis (e.g., central axis) along the line of pixels of the light source 116. In an embodiment, the reflective surface of the image expander 112 may rotate about an axis in a plane of the reflective surface. In an embodiment, the reflective surface may oscillate, such as between an angle where the reflective surface is perpendicular to the light source 116 and an angle where the reflective surface is parallel to the light source 116. Alternatively, the reflective surface may rotate in full revolutions. The reflective surface of the image expander 112 may rotate at a rate (e.g., rotations per unit time) associated with (e.g., in coordination with; based on) a rate (e.g., frames per unit time) at which the light source 116 displays frames of the image. In an embodiment, the reflective surface may rotate at a constant rate. Alternatively, the rate of rotation of the reflective surface may vary with a varying frame display rate of the light source 116. As the reflective surface of the image expander 112 rotates, the light source 116 may sequentially display frames of the image (e.g., one frame at a time) and the reflective surface may reflect the frames towards the user 118. As the angle of the reflective surface changes with respect to the light source 116 and the user 118, each successive frame displayed by the light source 116 may appear adjacent to the previous frame in the view of the user 118. As such, the reflective surface may expand the image due to the persistence of vision effect and may make the entire image appear to be displayed to the user 118 (e.g., the user 118 is able to visualize the entire image as if the entire image were presented and displayed at one time at the location of the light source 116).

In an embodiment, the light source 116 may be or illuminate a single point of light, such as a single light bulb, a single LED, a single laser diode, or the like. In an embodiment, the light source 116 may display a plurality of light patterns (e.g., sequence of illuminated pixels) that correspond to multiple frames of the image in quick succession. In an embodiment, the image expander 112 may include two or more reflective surfaces that may reflect the light corresponding to frames of an image toward the user 118. A first reflective surface may rotate in a first direction about a first axis to reflect the light corresponding to a first set of frames of the image displayed by the light source 116 (e.g., to draw out the light from the single point of light for visualization by the user 118) and a second reflective surface may rotate in a second direction about a second axis to reflect the light corresponding to a second set of frames of the image displayed by the light source 116 (e.g., to draw out the light from the single point of light for visualization by the user 118). For example, the first reflective surface may rotate in the first direction to reflect the light corresponding to the first set of frames of the image in a left to right sequential order and the second reflective surface may rotate in the second direction to reflect the light corresponding to the second set of frames of the image in a top to bottom sequential order. In this manner, each successive frame of the first set of frames may appear adjacent to the previous frame of the first set of frames in the view of the user 118 and each successive frame of the second set of frames may appear adjacent to the previous frame of the second set of frames in the view of the user 118.

Additionally or alternatively, the image expander 112 may include a dual axis reflector. The dual axis reflector may reflect the light corresponding to the frames of the image toward the user 118. The reflective surface of the dual axis reflector may rotate in a first direction about a first axis corresponding to a first set of frames of the image displayed by the light source 116 (e.g., to draw out the light from the single point of light for visualization by the user 118) and may subsequently rotate in a second direction about a second axis corresponding to a second set of frames of the image displayed by the light source 116 (e.g., to draw out the light from the single point of light for visualization by the user 118). For example, the reflective surface of the dual-axis reflector may rotate in the first direction to reflect the light corresponding to the first set of frames of the image from left to right and may subsequently rotate in the second direction to reflect the light corresponding to the second set of frames of the image from top to bottom. Thus, the single point of light may illuminate at a first time and be drawn out for the user 118 via rotation of the reflective surface about the first axis, the single point of light may illuminate at a second time and be drawn out for the user 118 via rotation of the reflective surface about the second axis, and so on until the image is completed. In this way, the single point of light may be drawn out for visualization by the user 118 (e.g., to provide the illusion of the image being displayed in full and extending along an x-axis and a y-axis at the location of the single point of light).

The motor 114 may move the components of the image expander 112, such as rotating the reflective surface of the image expander 112 relative to the light source 116. The motor 114 may be communicatively coupled to the system controller block 102 by any suitable techniques for communicating data and/or control signals between the processor 104 and the motor 114 to thereby enable the processor 104 to control operation of the motor 114. In an embodiment, the processor 104 may generate and transmit a control signal to the motor 114 to begin rotation of the reflective surface of the image expander 112. For example, the processor 104 may generate and transmit the signal in response to the receipt of data signals from the sensor 108 that indicate that the sensor 108 detected the pulse of light from the light source 116. Additionally, or alternatively, the processor 104 may generate and transmit control signals to both the motor 114 and the light source 116 to begin operation (e.g., in a coordinated manner; in a timed manner). In an embodiment, the processor 104 may generate and transmit control signals to the light source 116 to being operation (e.g., to request a new frame), such as in response to receipt of a signal from the display module 110 that indicates that the motor 114 is ready (e.g., turned on; receiving power), in response to receipt of a signal indicative of show timing, in response to receipt of a signal that indicates that the image expander 112 is reset, and/or in response to receipt of an input from the user (e.g., via a user interface, which may be associated with the display module 110 or may be within the attraction that uses the light display system 100) that indicates that the user is ready to observe the image, for example.

The image expander 112 may include any of a variety of configurations that enable the image expander 112 to make the image available for visualization by the user 118. For example, additionally or alternatively, the image expander 112 may include a micro-electromechanical system (MEMS) that includes any number of micro mirrors arranged in an array, and the micro mirrors may be controlled (e.g., to rotate relative to the light source 116) to display the plurality of light patterns the correspond to the frames in the manner discussed herein. Additionally or alternatively, the image expander 112 may include a reflective arrangement (e.g., a mirror and prism arrangement) for each eye of the user 118.

The system controller block 102 may be provided in the form of a computing device, such as a personal computer, a laptop, a tablet, a mobile device, a server, or any other suitable computing device. The system controller block 102 may be a control system having multiple controllers, each having at least one processor 104 and memory 106. As such, the processor 104 may include one or more general purpose microprocessors, one or more application specific integrated circuits (ASICs), and/or one or more field programmable logic arrays (FPGAs). The processor 104 may include receiving and conversion circuitry. In an embodiment, the processor 104 may control operation of the light source 116, and the processor 104 (e.g., the same or different processor of the at least one processor 104 of the system controller block 102) may receive sensor data (e.g., data signals) from the sensor 108 and/or may control operation of the motor 114. For example, the processor 104 may generate and transmit a control signal (e.g., via wired or wireless communication; via an antenna) to the light source 116 to begin displaying frames of the image. In an embodiment, the control signal may indicate which image to display and/or a rate at which frames of the image are emitted. Additionally or alternatively, the processor 104 (e.g., the same or different processor of the at least one processor 104 of the system controller block 102) may generate and transmit a control signal to the motor 114 to begin rotation of the reflective surface of the image expander 112 (e.g., in a coordinated manner with the display of the frames via the light source 116 to thereby enable the user 118 to visualize the image). Thus, one or more processors 104 may control operation of the light source 116 and/or the motor 114 to display an image to the user 118.

In an embodiment, the processor 104 may generate and transmit a control signal to other light sources in a vicinity of the user 118 and/or the light source 116. The control signal may turn off other light sources and/or the control signal may dim or alter a characteristic (e.g., color, brightness) of other light sources. For example, the control signal may be sent in response to receiving a data signal from the sensor 108 associated with the light source 116 beginning a display sequence. Additionally or alternatively, the processor 104 may generate and/or transmit the control signal to turn off other light sources in response to the processor 104 generating and/or transmitting a control signal for the light source 116 to begin a display sequence. Additionally or alternatively, the light source 116 may generate and/or transmit the control signal to other light sources in the vicinity of the user 118 and/or the light source 116 (e.g., upon beginning a display sequence; based on colors emitted during the display sequence). Such features may block the image expander 112 from altering (e.g., drawing out) light emitted by the other light sources, which may interfere in enjoyment and visualization of the image by the user 118.

The processor 104 may be communicatively coupled to the memory 106. In an embodiment, the memory 106 may store a set of images to be selected for display to the user 118 via the coordinated operation of the display module 110 and the light source 116. In an embodiment, the memory 106 may include one or more tangible, non-transitory computer-readable media that store instructions executable by the processor 104 and/or data to be processed by the processor 104. For example, the memory 106 may include random access memory (RAM), read only memory (ROM), rewritable non-volatile memory, such as flash memory, hard drives, optical discs, and/or the like.

In an embodiment, at least a portion of the light display system 100 may be incorporated into a device, such as a head-mounted device, a wearable device, a handheld device, and/or any other suitable device. A head-mounted device may be a device worn on a head of the user 118 and may include at least a portion in front of either one or both eyes of the user 118. A wearable device may be a device that is worn by or attached to the user 118, article of clothing worn by the user 118, integrated into clothing worn by the user 118, attached or integrated into a hat or another wearable article worn by the user 118. In an embodiment, a wearable device may be a device sized, shaped, and/or otherwise configured to be worn on a wrist or other part of an arm (e.g., bracelet). A handheld device may be held or carried by the user 118 (e.g., by a hand of the user 118). For example the display module 110 may be configured as a head-mounted device, a wearable device, or a handheld device. As a handheld device, the user 118 may lift and place the handheld device between the user 118 and the light source 116 in order to reflect the light from the light source 116 onto the eyes of the user 118 to enable the user 118 to visualize the image. It should also be appreciated that the light source 116 may be incorporate into such a device, or as part of any other suitable object. For example, the light source 116 may be coupled to or suspended from a building, worn by an animated character, and/or coupled to or suspended from a drone (e.g., unmanned aerial vehicle) that is configured to fly and/or hover in air.

Figure 2:
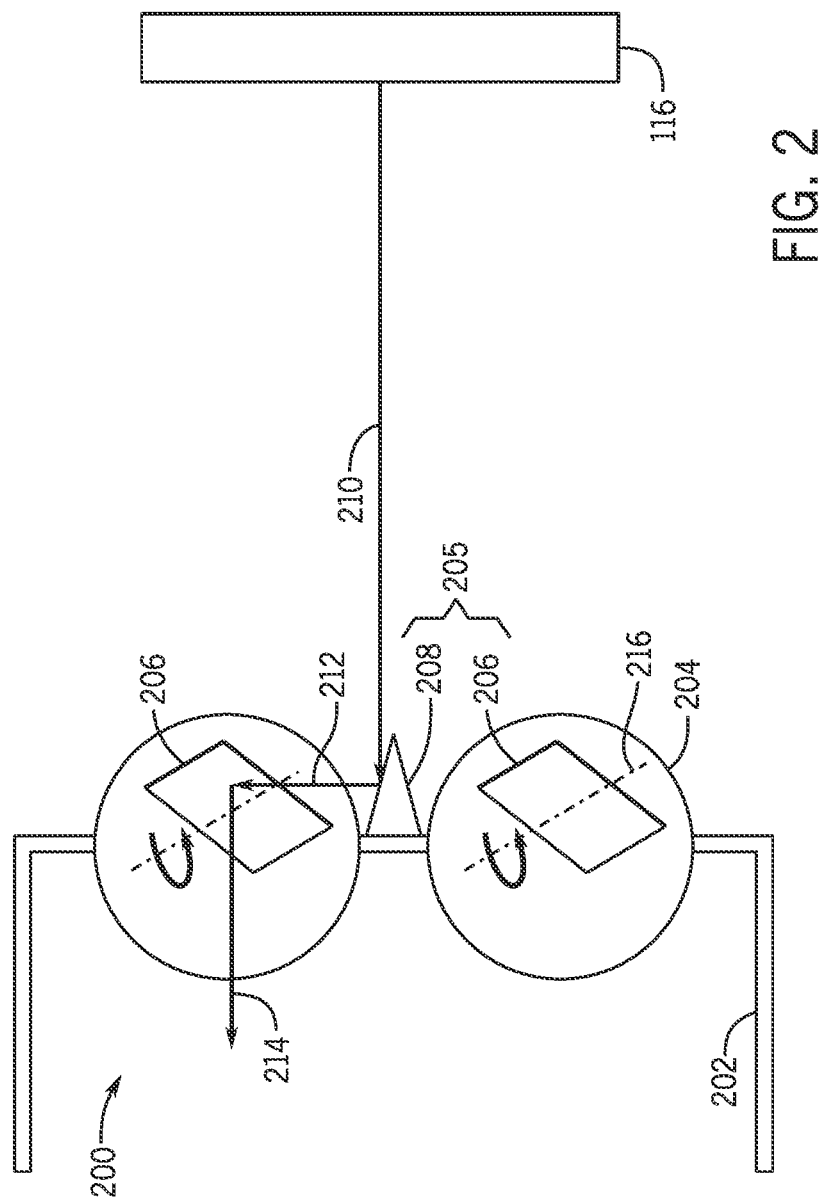
FIG. 2 illustrates a schematic diagram of a head-mounted device for a light display system, such as the light display system of FIG. 1, in accordance with an embodiment of the present disclosure.

With the foregoing in mind, FIG. 2 illustrates a schematic diagram of a head-mounted device 200 for a light display system, such as the light display system 100 of FIG. 1, in accordance with an embodiment of the present disclosure. The head-mounted device 200 may include a frame 202, a pair of lenses 204, and an image expander 205 including multiple reflective surfaces, such as reflective surfaces 206 and/or a prism 208. The head-mounted device 200 may be worn by a user, such as the user 118 in FIG. 1, by placing the frame 202 about the head of the user 118 and wearing the head-mounted device 200 in manner that is similar to wearing a pair of glasses. In an embodiment, the head-mounted device 200 may be a pair of glasses. In an embodiment, each lens of the pair of lenses 204 may contain a separate image expander, such as the image expander 112 in FIG. 1. Each separate image expander may include a reflective surface 206, and the reflective surface 206 may rotate relative to a light source, which may be the light source 116 of FIG. 1. Each reflective surface 206 may reflect light from the light source 116 and/or the prism 208.

In the illustrated embodiment, the reflective surface 206 may rotate relative to the prism 208 and the light source 116. In an embodiment, the reflective surface 206 may be a mirror, such as a semi-silvered or fully silvered mirror. Alternatively, the reflective surface 206 may be any number of micro mirrors as part of an optical MEMS (e.g., digital light processing [DLP] technology). As the user wearing the head-mounted device 200 looks toward the light source 116, the light source 116 may emit light in the direction of arrow 210. The prism 208 may reflect the light in the direction of arrow 212 toward the reflective surface 206. The reflective surface 206 may reflect the light in the direction of arrow 214 toward a pupil of the user wearing the head-mounted device 200.

The reflective surface 206 may be rotated by a motor, such as motor 114 in FIG. 1, which is controlled by the processor 104 in FIG. 1 to maintain a rate of rotation associated with (e.g., in coordination with) a rate at which the light source 116 displays frames of the image. Specifically, the processor 104 may send a control signal to the motor 114 in response to receiving a signal from the sensor 108 associated with detection of a beginning light sequence emitted by the light source 116. The reflective surface 206 may rotate about an axis of rotation 216 in a plane of the reflective surface 206. As the reflective surface 206 rotates, the light source 116 may sequentially display the plurality of light patterns that correspond to the frames of the image, and the reflective surface 206 and the prism 208 may reflect the plurality of light patterns that correspond to the frames toward the eyes of the user. As the angle of the reflective surface 206 changes with respect to the light source 116, each successive frame displayed by the light source 116 may appear adjacent to the previous frame in the view of the user. As such, the reflective surface 206 may expand the image due to the persistence of vision effect and may make the entire image appear to be displayed to the user. In an embodiment, the reflective surface 206 may be adjusted by a motor, such as the motor 114 in FIG. 1, which is controlled by the processor 104 in FIG. 1 to maintain a desired orientation of the reflective surface 206 relative to the light source 116. Specifically, the processor 104 may send a control signal to the motor 114 in response to a sensor, detecting that the head-mounted device 200 is turned and/or tilted relative to the light source 116 (e.g., due to movement of the user 118). In an embodiment, the sensor may include an accelerometer and/or a gyroscope that moves with the image expander 112 (e.g., is part of the head-mounted display) and is configured to determine an orientation of the reflective surface 206 relative to the light source 116.

It should be appreciated that multiple users each wearing a respective head-mounted device 200 may be able to view the image at the same time. For example, the system controller may control multiple head-mounted devices 200 in coordination with the light source 116 to enable the multiple users to view the image at the same time. In an embodiment, the system controller may receive an input indicative of a position of the user and the respective head-mounted device 200 worn by the user (e.g., via a position sensor; via radio-frequency identification [RFID], such as via an RFID tag on the head-mounted device 200 and an RFID reader that is communicatively coupled to the system controller). In such cases, the system controller may control the reflective surface 206 and/or the light source 116 based on the position of the user and the respective head-mounted device 200 worn by the user to accurately reflect the frames of the image toward the eyes of the user. In cases in which multiple users each wearing a respective head-mounted device 200 are present to observe the image (e.g., the multiple users are part of an audience for a show), the system controller may control the respective reflective surface 206 of each head-mounted device 200 based on the respective position of the respective head-mounted device 200 or the system controller may control the respective reflective surface 206 of each head-mounted device 200 in the same manner (e.g., to move together, such as at the same rate and through the same angle). Furthermore, the light source 116 may be configured to emit light in a manner that enables display of a different image depending on the perspective at which the user faces the light source 116. For example, a first user facing a front of the light source 116 may see an image of a front of a character while a second user facing a back of the light source 116 may see an image of a back of the same character.

It should be appreciated that the light source 116 may be placed at a desired distance from the user and/or the audience. As such, the user may focus on the light source 116 instead of focusing on a display of a virtual reality, mixed reality, or augmented reality headset. In an embodiment, the light source 116 may emit light at a particular wavelength and/or at a range of wavelengths. The head-mounted device 200 may include a filter, such as a band-pass filter, to pass through the particular wavelength and/or range of wavelengths and block out other wavelengths and/or ranges of wavelengths. As a result, the filter may reduce interference from other light sources in a vicinity of the user and/or the audience. For example, in a blue lit scene, the light source 116 may emit red light and the head-mounted device 200 may include a filter for passing through the red light (e.g., to one or both eyes of the user). A more elaborate filter arrangement may be provided, such as to smaller wavelength ranges and/or a different filter for each eye of the user.

Figure 3:
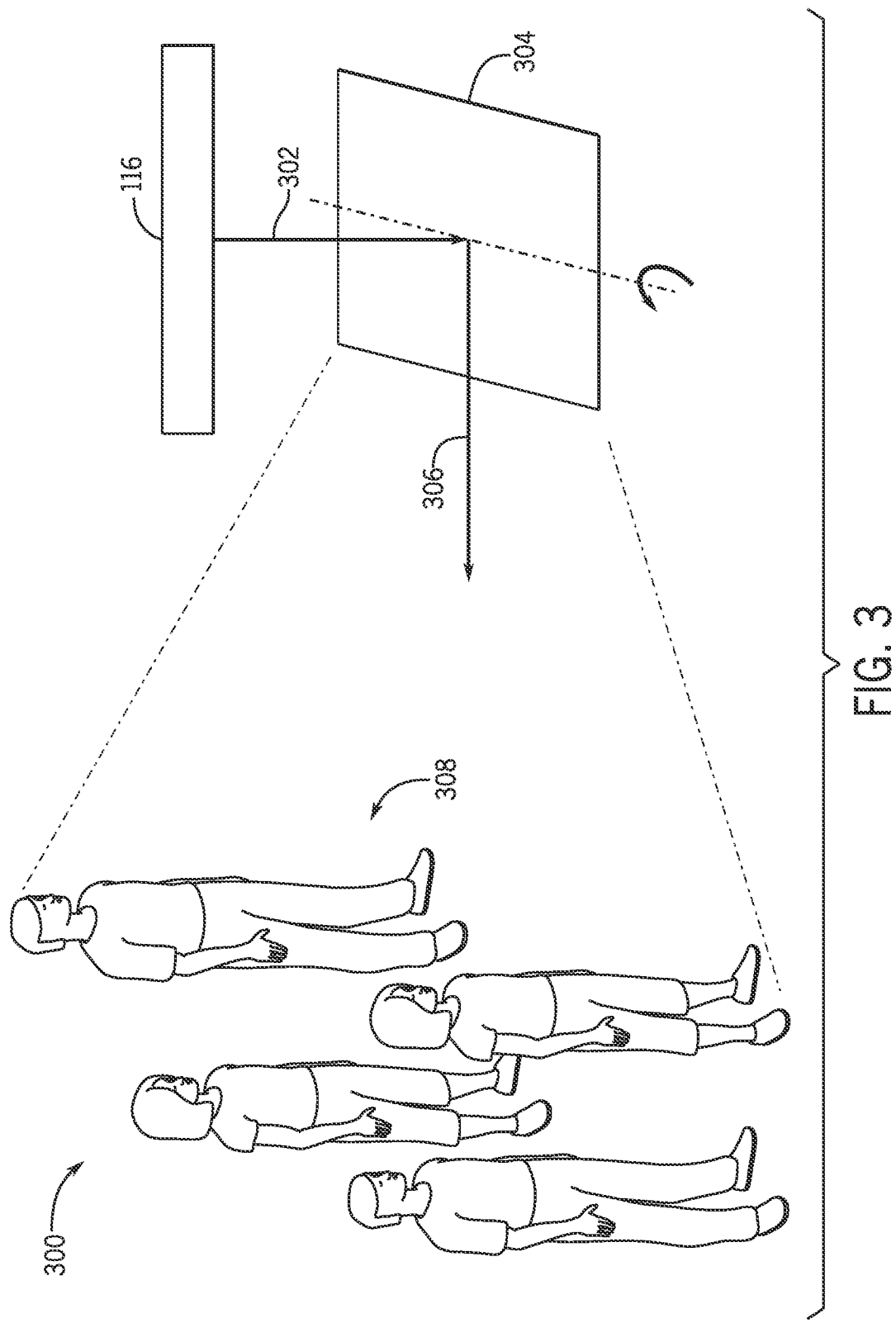
FIG. 3 illustrates a schematic diagram of a light display system including a head-mounted device, such as the head-mounted device of FIG. 2, in accordance with an embodiment of the present disclosure.

With the preceding in mind, FIG. 3 illustrates a schematic diagram of a light display system 300, such as the light display system 100 of FIG. 1, in accordance with an embodiment of the present disclosure. The light display system 300 includes a light source, which may be the light source 116 of FIG. 1, and a reflective surface 304. The light display system 300 may differ from the light display system including the head-mounted device 200 of FIG. 2 by having the reflective surface spaced further apart from the user (e.g., viewer of the image) and out of a head-mounted device than in the light display system of FIG. 2. As such, one or more users 308 may view an image displayed by the light display system 300 without wearing a head-mounted device. The reflective surface 304 may be configured to rotate relative to the light source 116. The reflective surface 304 may be a mirror, such as a semi-silvered mirror of a fully silvered mirror. The light source 116 may emit light in the direction of the arrow 302 toward the reflective surface 304. The reflective surface 304 may reflect light in the direction of arrow 306 toward one or more users 308 (e.g., audience). The reflective surface 304 may rotate at a rate associated with (e.g., in coordination with) a rate at which the light source 116 displays frames of the image. As the reflective surface 304 rotates, the light source 116 may sequentially display the frames of the image, and the reflective surface 304 may reflect the frames toward the one or more users 308. As the angle of the reflective surface 304 changes with respect to the light source 116, each successive frame displayed by the light source 116 may appear adjacent the previous frame in the view of the one or more users 308. As such, the reflective surface 304 may expand the image due to the persistence of vision effect and may make the entire image appear to be displayed to the one or more users 308. Additionally, the light display system 300 may include additional components, such as one or more additional reflective surfaces (e.g., a prism) to reflect light from the light source 116 toward the reflective surface 304 and/or to reflect light from the reflective surface 304 toward the one or more users 308.

FIG. 4 illustrates a schematic diagram of a light display system 400 including a light source 402 having only a single column of pixels 404 that is controlled to display one frame (e.g., frame 408, frame 410; a light pattern corresponding to the one frame) of an image at a time. In an embodiment, the light source 402 may be similar to light source 116 in FIG. 1 and may operate to emit light to provide any number of frames associated with an image. For example, each frame may correspond to a single column of pixels emitted by the light source 402 at an instant in time. Multiple frames (e.g., frames 408, 410) of the image may be generated and emitted by the light source 402 sequentially in quick succession. The reflective surface 412 may rotate relative to the light source 402, such as rotating about an axis of rotation 414. The axis of rotation 414 may be substantially parallel (e.g., equal to or within five, ten, or fifteen degrees) of a longitudinal axis 416 (e.g., central axis) of the light source 402. The longitudinal axis 416 may be aligned with the column of pixels 404 (or otherwise limited assembly of pixels) of the light source 402. As the reflective surface 412 rotates relative to the light source 402, the light source 402 may emit light patterns that correspond to sequential frames (e.g., frames 408, 410) of an image that may be reflected off of the reflective surface 412 and toward any number of users (e.g., one user wearing a head-mounted device or a group of users in an audience). As such, the reflective surface 412 may display sequential frames of an image adjacent to each other and may display an entire image composed of any number of frames that may be visualized by a user. Thus, the light display system 400 may give the illusion to the user that the image 406 is displayed (e.g., the entire image 406 at one time) at the location of the light source 402. Coordinated display of the multiple frames 408, 410 of the image and the movement of the image expander (e.g., reflective surface 412), as discussed above, enable the user to visualize the image.

It should be appreciated that any of the features illustrated and described with respect to FIGS. 1-4 may be combined in any suitable manner to display an image to one or more users. The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure. Advantageously, the disclosed system may reduce a size of a display (e.g., a single vertical column or horizontal row of pixels instead of multiple vertical columns and multiple horizontal rows of pixels), which may result in cost savings and/or space savings Additionally, the disclosed system may utilize the persistence of vision effects without physically moving the light source (e.g., without spinning or rapidly moving the light source to generate the persistence of vision effects), which may result in further cost savings, space savings, and/or simpler operation.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A light display system, comprising:
a light source configured to emit a plurality of light patterns that correspond to multiple frames of an image, wherein the light source is configured to sequentially emit the plurality of light patterns based on instructions from a control system such that the multiple frames are presented in a sequence at a first rate; and
a head-mounted device, comprising a first reflective surface and a second reflective surface, wherein:
the second reflective surface is configured to reflect the plurality of light patterns toward the first reflective surface; and
the first reflective surface is configured to reflect the plurality of light patterns toward a user of the head-mounted device, wherein the first reflective surface is configured to rotate relative to the light source at a second rate, wherein the first rate and the second rate are timed relative to one another to combine the multiple frames into the image for visualization by the user.

2. The light display system of claim 1, wherein the light source is configured to emit the plurality of light patterns that correspond to all of the multiple frames of the image within one sixteenth of a second.

3. The light display system of claim 1, wherein each frame of the multiple frames of the image corresponds to a single line of pixels associated with the image.

4. The light display system of claim 1, comprising a motor configured to rotate the first reflective surface relative to the light source.

5. The light display system of claim 1, wherein the second reflective surface is fixed relative to a frame of the head-mounted device.

6. The light display system of claim 1, wherein the second reflective surface is a prism.

7. The light display system of claim 1, wherein the first reflective surface is configured to align with and reflect the plurality of light patterns toward a first eye of the user.

8. The light display system of claim 7, wherein the head-mounted device comprises a third reflective surface configured to align with and reflect the plurality of light patterns toward a second eye of the user.

9. A light display system, comprising:
a light source configured to emit a plurality of light patterns that correspond to multiple frames of an image, wherein the light source is configured to sequentially emit the plurality of light patterns based on instructions from a control system such that the multiple frames are presented in a sequence at a first rate;
a prism configured to reflect a first portion of the plurality of light patterns toward a first reflective surface, wherein the first reflective surface is configured to rotate relative to the prism at a second rate, wherein the first rate and the second rate are timed relative to one another to combine the multiple frames into the image for visualization by a user; and
a motor configured to be controlled by the control system to drive the first reflective surface to rotate relative to the prism.

10. The light display system of claim 9, comprising a second reflective surface that is configured to rotate relative to the prism at the second rate, wherein the first reflective surface and the second reflective surface are supported within a head-mounted device that is configured to be worn by the user, the first reflective surface is configured to align with and reflect the first portion of the plurality of light patterns toward a first eye of the user, and the second reflective surface is configured to align with and reflect a second portion of the plurality of light patterns toward a second eye of the user.

11. The light display system of claim 10, wherein the prism is configured to reflect the second portion of the plurality of light patterns toward the second reflective surface.

12. The light display system of claim 9, comprising a sensor configured to detect a starting light emitted by the light source, wherein the sensor is configured to transmit a signal to the control system in response to detecting the starting light.

13. The light display system of claim 12, wherein the sensor is configured to sense infrared light, and the light source is configured to emit the starting light as infrared light.

14. The light display system of claim 9, wherein the first reflective surface is a semi-silvered mirror.

15. A light display system, comprising:
a light source configured to emit a plurality of light patterns that correspond to multiple frames of an image, wherein the light source is configured to sequentially emit the plurality of light patterns for the multiple frames such that the multiple frames are presented in a sequence at a first rate;
a reflective surface configured to rotate relative to the light source at a second rate, wherein the first rate and the second rate are timed relative to one another to combine the multiple frames into the image for visualization by a user;
a prism configured to reflect a portion of the plurality of light patterns onto the reflective surface;
a motor configured to drive the reflective surface to rotate relative to the light source;
a sensor configured to detect a starting light and to transmit a first signal in response to detecting the starting light, wherein the first signal is indicative of operation of the light source to emit the plurality of light patterns that correspond to the multiple frames of the image;
at least one processor communicatively coupled to the sensor and the motor; and
at least one non-transitory computer-readable media communicatively coupled to the at least one processor, the at least one non-transitory computer-readable media storing instructions which, when executed, cause the processor to perform operations comprising:
receiving, via the sensor, the first signal; and
in response to receiving the first signal, transmitting a second signal to the motor to cause the motor to drive the reflective surface to rotate relative to the light source at the second rate.

16. The light display system of claim 15, wherein the first signal is indicative of the first rate.

17. The light display system of claim 15, wherein the light source is a light bar formed of a plurality of light emitting diodes arranged in a single line.

18. The light display system of claim 15, wherein the reflective surface is supported within a head-mounted device that is configured to be worn by the user.

19. The light display system of claim 15, wherein the light source is configured to emit additional light patterns that correspond to multiple respective frames of a second image, wherein the light source is configured to emit the additional light patterns for the multiple respective frames of the second image such that the multiple respective frames are presented in a respective sequence.

20. The light display system of claim 15, wherein the light source is configured to emit the plurality of light patterns that correspond to the multiple frames of the image in a repetitive manner to thereby repeatedly display the image for visualization by the user.

* * * * *